United States Patent
Baumann et al.

Patent Number: 5,479,811
Date of Patent: Jan. 2, 1996

[54] PROCEDURE FOR CALIBRATING THE WHEEL SPEEDS FOR A MOTOR VEHICLE

[75] Inventors: Matthias Baumann, Böblingen; Gerhard Fischle, Esslingtn, both of Germany

[73] Assignee: Mercedes-Benz AG, Germany

[21] Appl. No.: 449,660

[22] Filed: May 24, 1995

[30] Foreign Application Priority Data

May 24, 1994 [DE] Germany .......................... 44 18 070.5

[51] Int. Cl.$^6$ .................................................. G01P 21/00
[52] U.S. Cl. ........................................................... 73/2
[58] Field of Search .................... 73/2, 1 D; 364/571.01, 364/571.02, 571.03

[56] References Cited

U.S. PATENT DOCUMENTS 5,292,184  3/1994  Takata ..................... 303/100

FOREIGN PATENT DOCUMENTS

| | | |
|---|---|---|
| 4019886C1 | 9/1991 | Germany . |
| 4130370A1 | 3/1992 | Germany . |
| 2284670 | 6/1995 | United Kingdom . |
| 89/02602 | 3/1989 | WIPO . |
| 89/04783 | 6/1989 | WIPO . |
| 94/06657 | 3/1994 | WIPO . |

OTHER PUBLICATIONS

British Search Report dated Jul. 12, 1995.

*Primary Examiner*—Robert Raevis
*Attorney, Agent, or Firm*—Evenson, McKeown, Edwards & Lenahan

[57] ABSTRACT

The invention provides a process for performing calibration of the wheel speeds of a motor vehicle by periodically calculating and applying correction factors. The instantaneous speed of each wheel is measured periodically, and a vehicle turning rate is determined based on the time derivative of the differential between left and right wheel speeds. Actuation of the vehicle brakes is also detected. According to the invention, a new correction factor is determined only after the following criteria have been satisfied concurrently for a predetermined time period: vehicle speed is above a specified minimum, acceleration is within a specified range, vehicle turning is below a specified limit and the brakes are not actuated. In a second embodiment, vehicle driving torque is used as a criteria in place of acceleration.

5 Claims, 1 Drawing Sheet

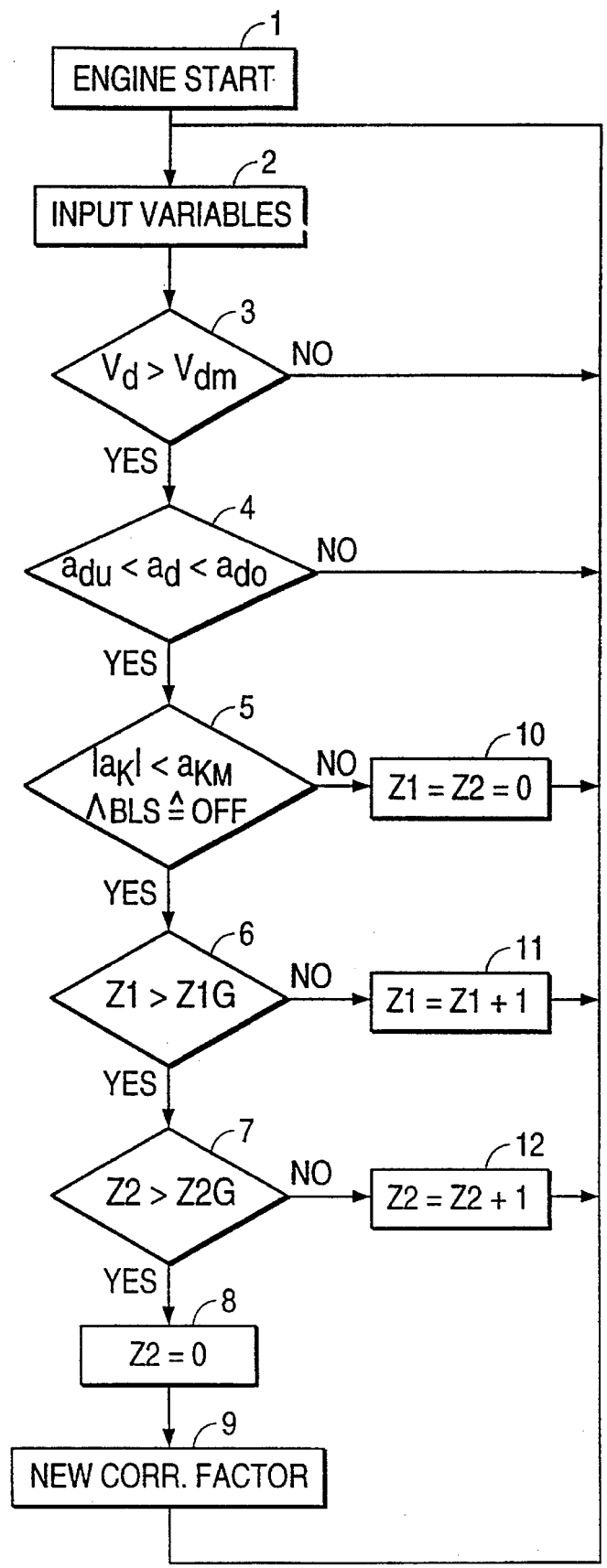

PROCEDURE FOR CALIBRATING THE WHEEL SPEEDS FOR A MOTOR VEHICLE

BACKGROUND AND SUMMARY OF THE INVENTION

The invention relates to a process for calibrating the wheel speeds for a motor vehicle by calculating correction factors for the individual wheels in certain driving conditions.

Particularly in the case of motor vehicles with wheel-slip control systems, or in the case of those in which the driver is provided with information on the current dynamic state of the vehicle, there is a need for wheel speed calibration. Without such calibration, differences in the dynamic rolling radius of the tires of the different wheels—even if within permissible tolerances—can accidentally activate the wheel-slip control system or the driver information system. Such activation can be implemented by a reduction of the engine torque in the presence of excessive drive slip, increase of the engine torque in the event of excessive engine overrun torque, engagement of locks in longitudinal and transverse differentials, the admission of pressure to individual wheel brakes or to several at once to stabilize the vehicle or avoid a locking effect, and the activation of an optical, acoustic or haptic signal to inform the driver on the current dynamic state of the vehicle or the occurrence of a system intervention.

Wheel calibration can be employed, for example, in conjunction with anti-lock brake systems (ABS), anti-slip regulation systems (ASR) and electronic traction systems (ETS). In these cases, the risk that a wheel is about to lock up or spin is generally detected by the fact that the time rate of change of the measured speed of the wheel concerned is no longer within a specifiable normal range. (That is, when the wheel acceleration exceeds an adjustable threshold value, there is a risk that the wheel will lock up or spin.) In the text which follows, the term "acceleration" will be taken to mean both an actual positive acceleration and a negative acceleration, i.e., a deceleration.

In order to detect deviations from the normal, desired wheel-slip behavior as early and reliably as possible, high-accuracy control systems must take account of the fact that the speeds of the vehicle wheels are not equal even in the case of slip-free, purely rolling straight-ahead travel. Rather, differences in wheel speed can result, for example, from manufacturing tolerances in the production of the tires, variations in the degree of wear of the tires and similar factors. Thus, typical wheel speed differences of the order of few percent cause a deviation in the peripheral speeds of the wheels of about 1 km/h at a speed of travel of about 100 km/h, a value which must be taken into account in modern all-wheel and wheel-slip control systems. That is, wheel-speed is calibrated by processing measured wheel speeds, taking into account the differing rolling circumferences of the individual wheels. Such rolling circumferences, it should be noted, are subject to continuous changes with respect to time, before they are evaluated by the downstream control system, e.g. an all-wheel drive and/or wheel-slip control system.

German patent document DE 40 19 886 C1 describes a two-stage wheel-speed calibration procedure of this kind in which, in a first stage, the wheels are calibrated in pairs on the same side and, in a subsequent second stage, are calibrated with respect to a reference wheel. In this arrangement, the first stage is activated only below a first limiting speed, and the second stage is activated only above a second limiting speed. In either case, there must be sufficiently little cornering, for which purpose, this patent envisages, as an alternative, either checking whether, after differention with respect to time, the magnitudes of the wheel speed values for each wheel are below a specified limiting value or checking whether the magnitude of the difference between the two averages of wheel speeds on the same side falls below a specified limiting value.

Unpublished German Patent Application P 43 27 491.9 likewise discloses a two-stage wheel-speed calibration procedure, in which a rapid, coarse calibration with respect to a wheel chosen as a reference is carried out in a first stage, and a pairwise fine calibration is carried out in a second stage, either on the same side or on the same axle, depending on the existing driving torque.

German patent document DE-OS 41 30 370 A1 describes a single-stage wheel-speed calibration procedure of the generic type which detects cornering by checking whether the left/right speed deviation remains below a specified limiting value; or, as an alternative, cornering sensors are used.

The object of the present invention is to provide a wheel-speed calibration process of the type described at the outset which requires little outlay in terms of sensors, can be carried out as rapidly and reliably as possible and, in particular also, can be carried out during active intervention of a wheel-slip control system.

This and other objects and advantages are achieved according to the invention, in which a single iteration of the procedure can be carried out in a comparatively short time period. A particular advantage of the process according to the invention is that it can be carried out in a fault-free manner even during active phases of a wheel-slip control system in order to re-exit from the wheel-slip control without the wheel calibration inhibiting itself. According to the invention a special process is used to detect straight-ahead travel; in particular the variation with time of the left/right speed deviation of at least the driven axle is differentiated during a specified time period, and a limiting-value undershoot is detected. This procedure avoids the risk that the wheel calibration will even out the speed differences during an intended wheel-slip control phase. It also avoids a loss of stability in the absence of a system intervention, since, in the unstable driving state, the wheel speeds change continuously, which is reflected in a limiting-value undershoot of the left/right speed deviation differentiated with respect to time, after which the wheel calibration is inhibited. Since the driven wheels have the same left/right speed deviation during cornering as the wheels of the non-driven axle but, in addition, respond to travel over μ-split roadways, consideration of the driven wheels is, per se, sufficient for detection of cornering since the driven wheels represent the more stringent condition. This helps to minimize the effort involved in the procedure, and the run time for one cycle of the procedure.

It is, of course, also possible, as an alternative, to use the time derivatives of the left/right speed deviation of all the axles for the detection of cornering, and to infer that sufficiently little cornering exists only if all of these derivative values remain below a defined limiting value. The specification of a time period during which, for the detection of a sufficient degree of straight-ahead travel, the left/right speed deviations differentiated with respect to time must remain below the specified limiting value, prevents erroneous detections during travel around a uniform curve since, in such driving situations, the left/right speed deviation is briefly constant and, as a result, its time derivative is zero. Consequently, the time period provided for this purpose is set to a value which encompasses the time period for turning operations and cornering which occur during normal driving.

After an engine start, the process operates continuously. The correction factor is redetermined only when, in addition to sufficiently little cornering, the brakes are not actuated for the same time period, a certain minimum speed is exceeded and vehicle acceleration is sufficiently low. If the engine torque is available as information (e.g. by a databus), it is possible, as an alternative, instead of the vehicle acceleration value to use the driving torque as a corresponding decision criterion to check sufficiently low-slip travel, and it may thereby be possible to achieve higher calibration accuracy. The specification of a certain minimum speed serves to even out the Ackermann-related difference between the average front-axle speed and the average rear-axle speed by means of the effect of the attitude angle. In addition, the effects of measurement errors and deviations in the speed detection decrease with higher speed. The speed-correction factors determined by the procedure then permit the formation of corrected, mutually matched wheel speeds by multiplication of the respectively measured speed by the associated correction factor.

In another embodiment of the invention, the arithmetic mean of the filtered wheel-speed values of all wheels is chosen as the reference speed. Although, in contrast to conventional procedures (in which the reference speed is the speed of a selected wheel), this makes it necessary to calibrate all four vehicle wheels, the deviations of the respective wheel speeds with respect to the reference speed are comparatively low and balanced. As a result, the calibration process reaches the calibrated zero level relatively rapidly with stepwise alteration of the speed-correction factor; even, for example, after the fitting of a wheel which differs greatly from the others. Calibration with respect to the arithmetic mean also causes the average correction factor of all the individual correction factors to retain the value 1, and a gradual drift of the correction factors (for example with the correction factors in each case being stored after the ignition has been switched off) is thus avoided.

If, on the other hand, calibration is performed relative to a reference wheel, instead of the unvarying selection of the reference wheel as one wheel of a non-driven axle, it is possible to select in each case as the reference wheel that wheel whose speed deviates least from the arithmetic mean of all the filtered wheel speeds, so that the choice varies. It is then no longer necessary to calibrate with respect to the reference wheel.

In contrast to calibration with respect to a fixed specified reference wheel, calibration with respect to the arithmetic mean (or with respect to a reference wheel which in each case comes closest to it) eliminates the risk that two or three wheels rotating relatively equally will be calibrated with respect to a wheel which deviates greatly from them.

In a further embodiment of the invention, the adaptation of the correction factors to the respective newly measured wheel speeds takes place in steps, thus preventing undesirably severe brief fluctuations in the correction factors, e.g. due to effects of the roadway.

In still another embodiment, an offset factor is added to the wheel-speed correction factors of the driven wheels, which allows for the drive slip that occurs during constant travel on the flat. If there are no continuous data available on the engine torque, a fixed offset factor can be chosen. If, on the other hand, such data are available, the offset factor can be chosen as a function of the respective drive or engine torque. In this way, it is possible to allow for trips which are almost without vehicle acceleration, but do involve a high driving torque, (e.g., on long upward slopes, or with a trailer or with a high engine overrun torque on long downward slopes).

Other objects, advantages and novel features of the present invention will become apparent from the following detailed description of the invention when considered in conjunction with the accompanying drawings.

BRIEF DESCRIPTION OF THE DRAWINGS

The single Figure shows a flow diagram of a wheel-speed calibration process for a motor vehicle with a wheel-slip control system, according to the invention.

DETAILED DESCRIPTION OF THE DRAWING

The wheel-speed calibration procedure illustrated schematically by the program flow chart in the figure can be employed, in particular, for a motor vehicle with a wheel-slip control system, e.g. ASR and electronic two-wheel or four-wheel traction systems. This process makes it possible to achieve sensitive control of the driving torque, and to provide the driver with a reliable indication of the corresponding information on the current driving state.

Wheel calibration first of all requires an initial starting step 1, which is in each case provided by the starting of the engine, after which the process is performed continuously until the ignition is subsequently switched off. (The duration of an iteration is typically about 10 ms.) In step 2 the input variables which are required for a wheel calibration are determined, in particular the wheel speeds and the state of a brake-light switch. Using these input data, it is then determined in the following steps as to whether the specified conditions for the determination of new speed correction factors have been met. Thus, in step 3, the system first interrogates whether the vehicle speed ($v_d$) is greater than a specified minimum speed ($v_{dm}$), the latter being set to 45 km/h in the present case. (The value used for the vehicle speed for this purpose is an arithmetic mean of the wheel speeds of the non-driven wheels determined from preceding wheel-speed measurements by filtering with a filter time constant of 90 ms; hence a separate sensor system is not required for this purpose.) The choice of 45 km/h as the limiting speed value is sufficiently large to ensure that the effect of the attitude angle evens out the Ackermann-related difference in speed between the average front-axle speed and the average rear-axle speed; on the other hand, it is sufficiently small to permit wheel calibration in as many driving situations as possible. The setting of a minimum speed of this order additionally has the effect that the measurement errors and deviations in the detection of the speed, which are particularly relevant at low speeds, do not significantly interfere with calibration. If the minimum speed is not reached, the procedure returns to step 2 to initiate a new calibration cycle.

If the required minimum speed is satisfied, it is then determined in step 4, whether force-free or at least sufficiently force-free (i.e., low-slip) travel is present; that is, whether the vehicle is travelling at a low acceleration or deceleration value. For this purpose, the instantaneous vehicle acceleration ($a_d$) is obtained by time differentiation and subsequent filtering (with a filter time constant of 220 ms) of the vehicle speed ($v_d$) determined, as described above, from the wheel speeds recorded. The system then checks whether this instantaneous acceleration value ($a_d$) is greater than a specified negative (retardation) limiting value ($a_{du}$), (which, in the present case, is set by way of example to $-0.5$ m/s$^2$), and below a positive (acceleration) limiting value (set for example at $+0.3$ m/s$^2$).

It should be noted that this check for sufficiently low-slip travel, which can be carried out with little effort, can permit a change to be made in the correction factor even when the vehicle is travelling along a rising or falling stretch of road at a constant vehicle speed, since the above conditions are met despite a large driving or overrun torque. Higher wheel calibration accuracy can therefore be achieved if evaluatable data on the driving or engine torque are available in the vehicle, e.g. via a CAN bus. In this case, the interrogation as to whether a sufficiently low vehicle acceleration or deceleration exists can be replaced or developed by setting a driving or engine-torque limiting value and interrogating the instantaneous engine torque. In this way, even higher wheel calibration accuracy can be achieved. If sufficiently low-slip travel is not present, the procedure returns once more to a point ahead of step 2 in order to carry out a new calibration cycle.

If, on the other hand, sufficiently low-slip travel is present, the system next checks, in step 5, whether a sufficiently high degree of straight-ahead travel (i.e. a sufficiently low rate of turning) is present, and that the brake pedal has not been actuated. The actuation of the brake pedal is detected by reference to the state of the brake-light switch (BLS), which is in the OFF state when the brake pedal has not been actuated. The decision criterion used for sufficient straight-ahead travel is whether the time derivative ($a_K$) of the difference between the left and right wheel speeds—filtered at 90 ms—of the driven axle is smaller than a specified (cornering) limiting value ($a_{KM}$). Compared with the customary detection method, (in which the left/right speed deviation itself is compared to a specified limiting value), this method of detecting sufficiently straight-ahead travel has the advantage that erroneous detection due to a stationary difference in the circumference of the two wheels on the same axle already present at the outset, (e.g. because an incorrect wheel has been fitted) is prevented. For example, if the respective radii of the two wheels differ from one another by 3%, this results, when travelling at 100 km/h, in a constant wheel speed difference of 3 km/h. The time derivative of this difference, however, is zero, and it is thus not possible erroneously to infer cornering.

For the detection of sufficiently straight-ahead travel, it is sufficient to utilize the time derivative of the left/right speed deviation of the wheels of the driven axle since, during turning, the wheels of the non-driven axle exhibit the same left/right deviation behavior. The driven wheels, however, also detect travel over μ-split roadways and, as a result, the specified limiting value for the driven wheels represents the more stringent condition. Omission of the additional monitoring of the left/right speed deviation, differentiated with respect to time, of the non-driven wheels, which is, of course, possible as an alternative, saves program code and program run time. This method of proceeding obviously does not require any further sensors for detecting turning.

The interrogation of the instantaneous travelling conditions is thus concluded. It is apparent, of course, that the checking steps 3 to 5 can be executed in a different order to that shown in the Figure or even in parallel.

A particular feature of the process according to the invention is that wheel calibration can also be carried out while the wheel-slip control system is actively intervening, which is desirable since the wheel-slip control system can be actuated due to wheels with unequal rolling radii. Thus, it is possible, following a tire change on the motorway involving the fitting of a widely differing spare wheel for example, to exit from wheel-slip control again despite an active wheel-slip control intervention (e.g., electronic-gas limitation of the driving torque, so that the vehicle does not go faster than the speed allowed thereby because spinning of the driven wheels is detected), while conventional wheel calibration procedures could inhibit themselves as a result. There is also no risk that the wheel calibration will even out the speed differences during an intended control operation and that the vehicle will then lose its stability in the absence of a wheel-slip control intervention, since, in an unstable state, the wheel speeds change continuously and wheel calibration is inhibited by the exceeding of the limiting value by the time derivative of the left/right speed deviation.

In addition to the criteria of steps 3–5 above, according to another feature of the invention, the wheel speed correction factor is revised only if sufficiently straight-head travel and an unactuated brake pedal in accordance with step 5 exists for a predetermined time period (in this example, 4.5 s), which prevents wheel calibration while the vehicle is travelling round a curve with a constant radius. Such travelling states (e.g. when turning off or travelling round a curve) ordinarily end after at most about 4 s in normal driving. Therefore, as discussed below, a first counter (Z1) having a limiting value (Z1G) is provided so that the first counter (Z1) counts down a time period of 4.5 s. Furthermore, a second counter is also provided, having a limiting value (Z2G) which precludes alteration of the wheel-speed correction factors in every program cycle given the calibration conditions, performing it instead at the earliest after a time period determined by this second counter limiting value (Z2G), the time period selected being, in the present case, 250 ms. This results in a certain calming of the determination of the correction factor during calibration phases on stretches of poor road.

The two specified time counters (Z1, Z2) are initially set to zero, and are reset to zero in step 10 if the brake-light switch and cornering interrogation in step 5 are negative, after which the program returns to step 2 to carry out a new calibration cycle. If, on the other hand, the interrogation in each of steps 3 to 5 was positive, then, in step 6, the system checks whether the first counter value (Z1) has exceeded the specified limiting value (Z1G). If not, the count (Z1) is increased by 1 in step 11, after which the program returns once again to step 2 for a new iteration.

If sufficiently straight-ahead travel and nonactivation of the brakes are present over the specified time period of 4.5 s, as checked by steps 5 and 6, the process continues in step 7 with the interrogation as to whether the second count (Z2) is higher than a specified second counter limiting value (Z2G). If not, the second count (Z2) is increased by one in step 12, and the program returns again to a point ahead of step 2 to carry out a new program cycle. If, on the other hand, the second counter (Z2) has exceeded the specified limiting value (Z2G), then, after the second counter (Z2) has been reset to zero again in step 8 for the renewed counting down of the calibration time interval, the determination of new correction factors is carried out as follows in step 9.

The wheel-speed correction factors are in the form of scaling factors with a resolution of 1/10,000. For each wheel, the valid correction factor is, after an engine start, initially set to 10,000. (As will be apparent from the discussion which follows, any number could be used for this purpose; 10,000 is used in order to provide the desired resolution.) The arithmetic mean forming the reference speed is first of all determined from the instantaneous values for the filtered wheel speeds. For each wheel, the quotient of the reference speed and the instantaneous filtered speed of that wheel is then calculated and multiplied by 10,000, giving a current correction factor. (Instead of the wheel speed, it is, of course, possible to use the equivalent variable "wheel velocity" throughout.) The difference between the correction factor thus determined and the previous value (still valid at this time) is then formed and filtered together with previously obtained difference values using a specified filter time constant, e.g. 1,000 ms.

The filtered difference values of the wheels are then divided by a common parameter value, (which, in the present case, is set to the value 15) to form respective "correction values". The latter are then used to form new valid correction factors from the preceding valid correction factors, by adding the calculated correction value to the preceding valid correction factor, individually for each wheel. A respective drive-slip offset value is then added to the correction factors of the driven wheels, as an estimated allowance for the influence of the driving torque. In the present case, this offset value is set to 40, corresponding to 0.4% drive slip.

The purpose of dividing the differences determined between the valid and the instantaneous wheel-speed correction factor by the parameter value mentioned above, which determines the calibration speed, is to achieve a gradual incremental adjustment of the valid correction factor, (i.e. the correction factor used for the subsequent calculation of corrected wheel speeds) to the instantaneous correction factor determined. Since, the rate at which this adjustment takes place is thus a function of the magnitude of the existing deviation, large wheel-speed deviations in the case of slip-free straight-ahead travel are rapidly corrected, thus avoiding an unnecessary wheel-slip control intervention. If, however, the wheel speeds then already approximately match owing to the altered valid correction factors, the correction factors subsequently change only slowly. This method of variably incrementing or decrementing the correction factors in addition to the measure of carrying out the redetermination of correction factors only at specified time intervals of, for example, 250 ms, affords a steady, uniform behavior of the correction factor determination, even on stretches of poor road. In order to prevent inadequacies, e.g. due to oscillating measured values of speed sensors, which inadequacies would give implausible correction factors no longer susceptible of evaluation, the maximum correction is limited to ±6%.

With the valid correction factors determined in this way in the wheel calibration, it is then possible to determine the corrected, i.e. scaled, wheel speeds as the product (divided by 10,000) of the respective instantaneous wheel speed determined and the associated valid wheel-speed correction factor, and to use it for the wheel-slip control system and for the purpose of informing the driver on the driving state.

With the end of step 9 for redetermining correction factors and scaled wheel speeds resulting therefrom, one complete calibration cycle is concluded and the program returns again to step 2 to begin a new iteration. Only when the vehicle is parked is the continuously repeated wheel calibration ended. If the control unit carrying out the wheel calibration has remained active despite the vehicle ignition being switched off, e.g. for a temperature calculation, then, when the engine is restarted, the last valid wheel-speed correction factors still present in the control unit are used as initial values instead of the initial values of, in each case, 10,000 which are otherwise used in the case of an engine start involving restarting of the control unit.

The wheel-speed calibration procedure described above permits rapid and comparatively accurate calibration. It is self-evident that the person skilled in the art is capable of making numerous modifications to the example described above while remaining within the scope of the invention. In particular, it is possible, given driving-torque information, to replace the interrogation of a sufficiently low vehicle acceleration by an interrogation of the driving torque.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for calibrating wheel speeds for a motor vehicle having a plurality of wheels, of the type wherein wheel speed correction factors for forming mutually matched corrected wheel speeds are determined only when vehicle speed exceeds a predetermined minimum speed, vehicle brakes are not actuated, and vehicle turning is sufficiently small, said process comprising the steps of:

detecting an instantaneous speed of each vehicle wheel;

determining a vehicle turning rate based on magnitude of a time derivative of a difference between respective speeds of left and right wheels of said vehicle;

detecting a signal indicative of actuation of said vehicle brakes;

determining when the following conditions are satisfied
   (i) vehicle speed is greater than a predetermined minimum value;
   (ii) vehicle acceleration is between predetermined upper and lower limits;
   (iii) vehicle turning rate is below a predetermined limit; and
   (iv) vehicle brakes are not actuated; and calculating a new wheel speed correction factor only when all of the conditions in said determining step are satisfied concurrently for a predetermined time period.

2. Process according to claim 1 wherein said step of determining whether said vehicle speed is greater than a predetermined minimum is based on an arithmetic mean of instantaneous speeds of the respective vehicle wheels.

3. Process according to claim 1 wherein said calculating step comprises:

determining a time series of differences between newly determined instantaneous wheel speed correction factors and a next preceding previously determined speed correction factor;

filtering said time series of differences;

dividing said filtered time series of differences by a predetermined value to determine a correction value;

adding said correction value to a previously determined speed correction factor.

4. Process according to claim 3 comprising the further steps of adding a predetermined offset quantity to newly determined correction factor, to allow for drive slip.

5. Process for calibrating wheel speeds for a motor vehicle having a plurality of wheels, of the type wherein wheel speed correction factors for forming mutually matched corrected wheel speeds are determined only when vehicle speed exceeds a predetermined minimum speed, vehicle brakes are not actuated, and vehicle turning is sufficiently small, said process comprising the steps of:

detecting an instantaneous speed of each vehicle wheel;

determining a vehicle turning rate based on magnitude of a time derivative of a difference between respective speeds of left and right wheels of said vehicle;

detecting a signal indicative of actuation of said vehicle brakes;

determining when the following conditions are satisfied (i) vehicle speed is greater than a predetermined minimum value;

(ii) driving torque of said vehicle is within a predetermined range;

(iii) vehicle turning rate is below a predetermined limit; and (iv) vehicle brakes are not actuated; and calculating a new wheel speed correction factor only when all of the conditions in said determining step are satisfied concurrently for a predetermined time period.

* * * * *